July 11, 1939.  H. C. WELLMAN  2,165,431
STILL MECHANISM FOR MOTION PICTURE PROJECTORS
Filed Oct. 28, 1937
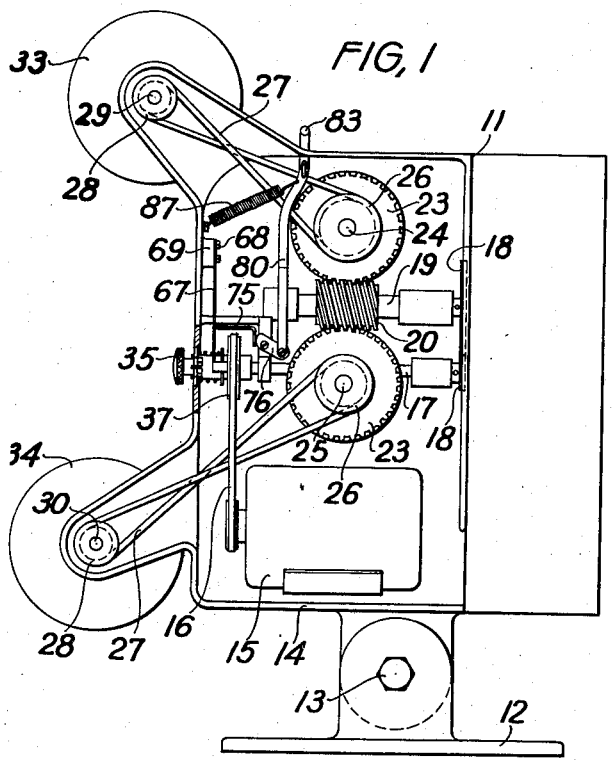
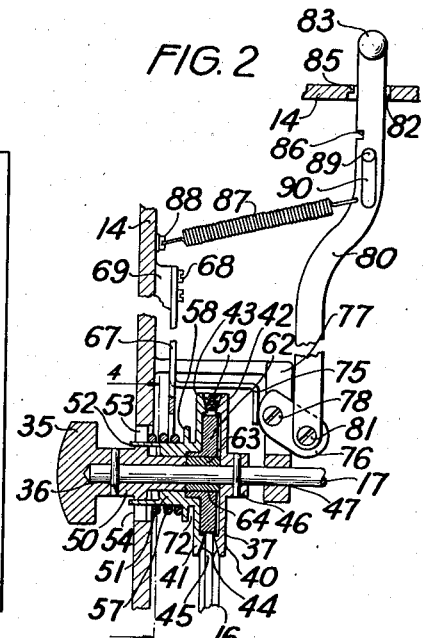
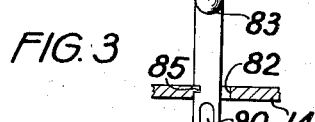
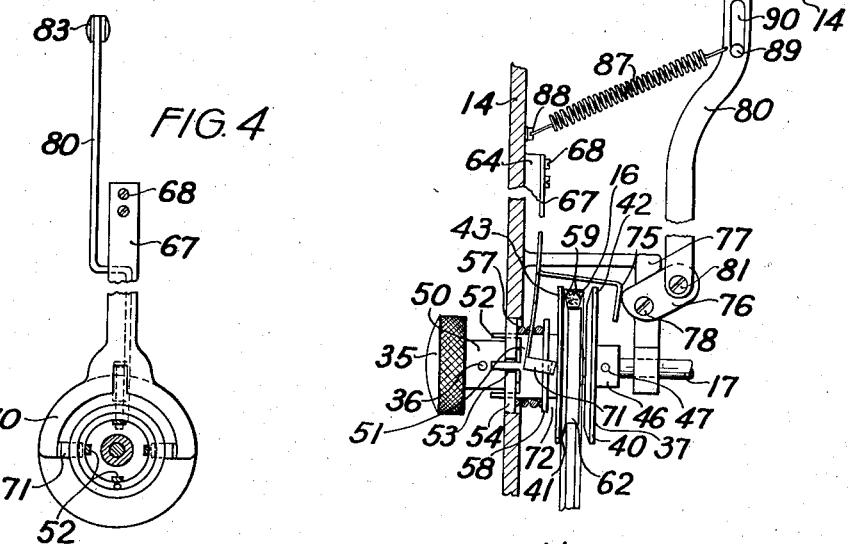
Howard C. Wellman
INVENTOR
BY
ATTORNEYS Patented July 11, 1939

2,165,431

UNITED STATES PATENT OFFICE 2,165,431

STILL MECHANISM FOR MOTION PICTURE PROJECTORS

Howard C. Wellman, Rochester, N. Y., assignor to Eastman Kodak Company, Rochester, N. Y., a corporation of New Jersey Application October 28, 1937, Serial No. 171,513

3 Claims. (Cl. 74—230.24)

The present invention relates to projectors, and more particularly to a mechanism for disconnecting the drive shaft of the projector from the motor drive to permit the projection of stills.

One object of the invention is the provision of a mechanism by which the drive shaft of the projector may be selectively disengaged from the drive motor to permit the projection of stills.

Another object of the invention is the provision of a mechanism which permits the projection of stills without necessitating the shutting down of the drive motor.

A further object of the invention is the provision of a mechanism of the class described which affords a positive drive connection between the drive motor and the drive shaft of the projector, yet which readily permits the disconnecting of the drive shaft from the motor.

A still further object of the invention is the provision of a still mechanism which is simple in construction, relatively inexpensive to manufacture, and highly effective in use.

To these and other ends, the invention resides in certain improvements and combinations of parts all as will be hereinafter more fully described, the novel features being pointed out in the claims at the end of the specification.

In the drawing:

Fig. 1 is a side view of a projector, showing the relation thereto of a "still" picture mechanism constructed in accordance with the present invention;

Fig. 2 is an enlarged vertical sectional view through a portion of the mechanism illustrated in Fig. 1, showing the relation of the parts of the "still" picture mechanism constructed in accordance with the preferred embodiment of the invention;

Fig. 3 is a side elevation view of the mechanism illustrated in Fig. 2, with the parts in a different position to disconnect the drive shaft from the drive belt; and Fig. 4 is a vertical sectional view taken substantially on the lines 4—4 of Fig. 2, showing the arrangement of the shift mechanism.

Similar reference numerals throughout the various views indicate the same parts.

The present invention relates to a mechanism for use on motion picture projectors whereby the movement of the film strip can be stopped to permit the projection of stills. After the desired stills have been viewed, the drive shaft may be again connected to the driving means to move the film strip through the projector.

Referring now to the drawing, and more particularly to Fig. 1, there is shown a projector, generally indicated by the numeral 11, formed with a base 12 on which is piovted at 13 an upper housing or support 14 to which the various film moving members are mounted, as is well known to those in the art. An electric motor 15, suitably mounted on the housing 14, is connected by a V-shaped belt 16 to the projector drive shaft 17, in a manner to be later described. The shaft 17 carries a shutter, not shown, and is connected by the spur gears 18 to another shaft 19 on which is mounted a worm gear 20 which meshes with a pair of gears 23 on the upper and lower sprocket shafts 24 and 25 respectively. The shafts 24 and 25 are provided with pulleys 26 which are connected by belts 27 to pulleys 28 on the supply and takeup spindles 29 and 30 respectively. The above construction is all clearly illustrated in Fig. 1, and as it does not constitute a part of the present invention, a further description is not deemed necessary for those familiar with the art.

As is well known, a supply reel 33 is mounted on the spindle 29, and a leader strip, not shown, is then threaded through the machine and secured to the takeup reel 34 carried by the spindle 30. In order to insure the proper engagement of the pulldown claw, not shown, with the film perforations, the drive shaft 17 may be manually rotated by means of a threading knob 35 secured to the shaft 17 by means of a pin 36, as shown in Figs. 2 and 3. After the machine has been properly threaded, it may be operated by means of the motor 15 which is connected by the belt 16 to a split pulley, generally indicated by the numeral 37, mounted on and rotatable with the drive shaft 17, as hereinafter more fully described.

During the projection of a motion picture, it is often desirable to disengage the film feeding mechanism from the driving motor or belt so that the movement of the film strip may be arrested to permit the projection of stills. To secure this result, the present invention provides a mechanism whereby the drive shaft 17 may be easily and quickly disconnected from the drive belt 16 to permit the projection of stills, or may be operatively connected to provide a positive drive connection between the belt 16 and the shaft 17 so that the film strip may be moved through the machine, as is well known to those in the art.

Referring now to Fig. 2, the split pulley 37 comprises a pair of spaced disk-like members 40 and 41 having peripheral flanges 42 and 43 respectively, the inner faces of which are beveled, as shown at 44, to provide a recess or groove 45 adapted to receive the V-shaped belt 16. The member 40 is formed with an axially or laterally extending sleeve 46 which is rigidly secured to the shaft 17 by means of a pin 47. The threading knob 35 is formed with an inwardly projecting tubular member 50 on which an axially extending sleeve 51 of the member 41 is slidably mounted, see Fig. 2. The outer end of the sleeve 51 is formed with a plurality of pronglike members 52 which extend through registering opening 53 in a collar 54 on the member 50 so that the sleeve 51, and hence the member 41, will be rotated upon rotation of the shaft 17. The members 52, and the opening 53 thus provide, in effect, a spline connection between the tubular member 50 and the sleeve 51 whereby the latter may slide axially on the member 50, but is rotated upon the rotation of the member 50. As the member 50 is secured to the shaft 17 by reason of the pin 36, the movable pulley member 41 may be broadly considered as splined to the shaft 17 so as to move axially thereon but rotatable as a unit therewith.

The pulley member 41 is moved to belt engaging position, or to the right, as viewed in Figs. 2 and 3, by means of a coil spring 57 the convolutions of which are wrapped around the sleeve 51 and constrained between the collar 54 and a collar 58 formed on the sleeve 51. This spring 57 thus tends to move the member 41 to the right, as shown in Figs. 2 and 3, so as to bring the beveled faces 44 of the members 40 and 41 into engagement with the corresponding beveled sides 59 of the belt 16, as shown in Fig. 2, so that the belt may rotate the pulley 37 and hence the drive shaft 17.

In order to project stills, it is obviously necessary to disconnect the drive shaft 17 from the motor 15 and the drive belt 16. To this end, the present invention provides an arrangement for separating the members 40 and 41 so that the faces 44 thereof will be moved out of engagement with the sides or driving surfaces 59 of the belt 16. This is accomplished by providing a shifting mechanism, to be presently described, which engages the movable member 41 to move the latter to the left, or to the position shown in Fig. 3. When in this position, the faces 44 have been moved out of contact with the belt 16 so the latter will not rotate the split pulley 37, as is apparent from an inspection of Fig. 3. When the members 40 and 41 are thus separated, the belt 16 drops onto a center piece 62 loosely mounted on the shaft 17, and revolves only this center piece, the pulley 37 and the shaft 17 then remaining stationary to permit the projection of stills. A suitable bushing 63 may be pressed into the central opening 64 of the center piece 62 to provide a bearing for the latter on the shaft 17.

The shifting mechanism comprises, in the preferred embodiment, a leaf spring 67 one end of which is secured by means of screws 68, or other suitable fastening means, to a lug 69 mounted on the machine housing 14, as clearly shown in Figs. 1, 2, and 3. The free end of the spring 67 is formed with curved bifurcations or arms 70, the tips or ends of which are bent, as shown at 71, to extend diametrically into a groove 72 formed between the member 41 and the collar 58, as clearly shown in Figs. 2 and 3. It is thus apparent that if the leaf spring 67 is moved or flexed to the left, as viewed in Figs. 2 and 3, the bent ends 71 of the arms 70 will engage the collar 58 to move the member 41 to the left to disengage the belt 16 from the pulley 37, as above described. It is also apparent that the leaf spring 67 tends to move the member 41 to the right, as viewed in Figs. 2 and 3, and thus cooperates with the coil spring 57 in returning and holding the movable member 41 in belt engaging position, as shown in Fig. 2.

The leaf spring 67 is also formed with a laterally extending L-shaped arm 75 adapted to engage a cam 76, of the shape best shown in Figs. 2 and 3, which is secured, adjacent one end thereof, to the bearing bracket 77 by means of a screw 78, or other suitable fastening means. Thus, when the cam 67 is moved from the position shown in Fig. 2 to that shown in Fig. 3, the leaf spring 67 is flexed, and the member 41 is slid axially along the tubular member 50 to permit the belt 16 to drop onto the loose center piece 62, thus disconnecting the shaft 17 from the drive belt 16. Conversely, when the cam 76 is returned to the position shown in Fig. 2, the leaf spring 67 straightens out, and cooperates with the coil spring 57 to move the member 41 to the right, as viewed in Fig. 2, to again operatively connect the belt 16 to the shaft 17 to rotate the latter. The springs 57 and 67 also yieldably hold the member 41 in belt engaging position, as is apparent from an inspection of the drawing.

The cam 67 is controlled by a bent lever or arm 80 which is pivoted at 81 to the cam, and extends upwardly through an opening 82 in the housing 14, as clearly shown in Figs. 2 and 3. The free end of the arm 80 is provided with a finger-gripping portion 83. The parts are normally in a position shown in Fig. 2, in which the belt 16 is operatively connected to the shaft 17 to rotate the latter so as to remove the film strip through the machine, as is well known to those in the art. When, however, the arm 80 is lifted upwardly to the position shown in Fig. 3, the cam 76 is rotated to flex the spring 67 and to move the member 41 to the left, as above described, to disengage or declutch the shaft 17 from the drive belt 16. The arm 80 may be locked in its raised position by moving it to the left, as viewed in Fig. 2, so as to bring a lug 85 on the housing 14 into a recess or notch 86 formed on the arm 80. To facilitate this moving and locking of the arm 80, a coil spring 87 may be provided. This spring has one end thereof connected to the arm 80 and the other end anchored to the head of a screw 88 fastened to the housing 14. In addition to holding the arm 80 in locked position, the spring 87 also assists the downward movement of the arm 80 upon the release of the latter, as will be apparent from an inspection of Figs. 2 and 3. The arm 80 is guided in its vertical movement by means of a pin 89 extending outwardly from the housing 14 and into a slot 90 formed in the arm 80.

It is thus apparent from the above description that the present invention provides a mechanism by which the drive shaft may be readily and easily disconnected or declutched from the drive belt to stop the drive shaft to permit the projection of stills. In order to move the shutter and/or bring the desired image area into position to be projected as a still, the threading knob may be rotated, thus manually rotating the drive shaft 17 to move the film strip through the film gate to bring the desired picture area into projecting position. Thus stills may be projected without necessitating the shutting down of the drive motor 15. When, however, the split pulley parts are moved to the position illustrated in Fig. 2, a positive driving connection is provided between the drive belt 16 and the shaft 17 so that the latter may be continually driven to feed the film strip through the machine.

While one embodiment of the invention has been disclosed, it is to be understood that the inventive idea may be carried out in a number of ways. This application is, therefore, not to be limited to the precise details described but is intended to cover all variations and modifications thereof falling within the spirit of the invention and the scope of the appended claims.

I claim:

1. In a motion picture projector the combination, with a shaft, an electric motor, a drive belt connected to said motor, of a split drive pulley mounted on and rotatable with said shaft, said pulley comprising a pair of flanged members arranged to engage said belt to operatively connect the latter to said shaft, one of said members being fixed to said shaft and the other of said members being slidable on said shaft, a pair of spring members engaging said movable member and tending to move the latter toward said stationary member to connect said members to said belt, and means for engaging one of said spring members for moving said movable member away from said stationary member to disconnect said members from said belt.

2. In a motion picture projector, the combination with a drive shaft, an electric motor, a drive belt connected to said motor, of a split drive pulley mounted on and rotatable with said shaft, said pulley comprising a pair of flanged members arranged to engage said belt to operatively connect the latter to said shaft, one of said members being fixed to said shaft and the other of said members being slidable on said shaft, a centerpiece loosely mounted on said shaft and positioned intermediate said members, a coil spring engaging said movable member and tending to move the latter toward said stationary member to connect said members to said belt, a flexible shifting mechanism operatively connected to said movable member and cooperating with said coil spring to maintain said members in engagement with said belt, and control means for moving said shifting mechanism to separate said member and to permit said belt to drop onto said centerpiece so that said shaft will be disconnected from said drive belt.

3. In a motion picture projector, the combination with a housing, a drive shaft rotatably mounted in said housing, an electric motor, a drive belt connected to said motor, of a split pulley comprising a pair of members formed with peripheral flanges arranged to engage said belt to connect the latter to said pulley, one of said members being rigidly secured to said shaft, a threading knob on said shaft and formed with an axially extending sleeve surrounding said shaft, the other of said members being splined on said sleeve so as to rotate therewith, but slidable axially relative thereto, a coil spring interposed between said sleeve and said other member and tending to move the latter toward said one member to bring said members into driving engagement with said belt, a centerpiece loosely mounted on said shaft and positioned between said members, a shift mechanism comprising a leaf-spring having one end thereof secured to said housing and the other end operatively connected to said other member, said mechanism cooperating with said coil spring to hold said members in engagement with said belt, a cam pivotally mounted on said housing and adopted to move said mechanism to separate said members to permit said belt to drop onto said centerpiece, whereby said shaft is disconnected from said belt, and a lever for moving said cam.

HOWARD C. WELLMAN.